US010950382B1

(12) United States Patent
Huang

(10) Patent No.: US 10,950,382 B1
(45) Date of Patent: Mar. 16, 2021

(54) AUTOTRANSFORMER RECTIFIER UNIT WITH MULTIPLE ALTERNATING CURRENT LEVEL OUTPUTS

(71) Applicant: The Boeing Company, Chicago, IL (US)

(72) Inventor: Jian Huang, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/739,643

(22) Filed: Jan. 10, 2020

(51) Int. Cl.
 H01F 30/14 (2006.01)
 H01F 30/02 (2006.01)
(52) U.S. Cl.
 CPC ............. *H01F 30/14* (2013.01); *H01F 30/02* (2013.01)
(58) Field of Classification Search
 CPC .......... H01F 30/14; H01F 30/12; H01F 30/02; H01F 27/00–36; H02M 7/04; H02M 7/08; H05K 7/20927
 See application file for complete search history.

(56) References Cited

U.S. PATENT DOCUMENTS

| 5,781,428 | A * | 7/1998 | Paice | H01F 30/12 363/126 |
| 7,772,953 | B2 | 8/2010 | Huang et al. | |
| 7,772,954 | B2 | 8/2010 | Huang et al. | |
| 8,737,097 | B1 * | 5/2014 | Swamy | H02M 7/06 363/67 |
| 9,230,726 | B1 * | 1/2016 | Parker | B22F 7/08 |
| 2010/0176755 | A1 * | 7/2010 | Hoadley | H02P 27/06 318/105 |
| 2011/0216564 | A1 * | 9/2011 | Swamy | H02M 7/08 363/126 |
| 2013/0088019 | A1 * | 4/2013 | Huang | H02P 9/00 290/1 C |
| 2013/0094257 | A1 * | 4/2013 | Warr | H02M 7/08 363/64 |
| 2013/0170257 | A1 * | 7/2013 | Ganev | H02M 5/14 363/44 |
| 2014/0313800 | A1 * | 10/2014 | Swamy | H02M 7/08 363/126 |

* cited by examiner

*Primary Examiner* — Fred E Finch, III
*Assistant Examiner* — Kevin H Sprenger
(74) *Attorney, Agent, or Firm* — Sage Patent Group

(57) ABSTRACT

An electric power system is provided that includes a three-phase to two twelve-phase transformer. The transformer includes first and second primary winding groupings, secondary winding groupings, and third, fourth, and fifth windings. The groupings can include sub windings. First primary winding groupings are coupled to form a wye configuration and coupled to second primary winding groupings and the windings. The first of the two twelve-phase outputs at the same voltage as the input voltage while the second twelve-phase output is at a lower voltage. Diode pairs are connected to each other, each diode pair having an inner connection connected to one of the outputs of the transformer and first and second ends respectively connected to a positive dc bus and a negative dc bus. The diode pairs operatively rectify the transformer output voltage to form a DC voltage with a reduced common mode voltage.

20 Claims, 10 Drawing Sheets

| Designation | |
|---|---|
| First primary winding Grouping | groupings of winding 304 (N1) and winding 306 (N2) in line with A1, B1, or C1 |
| Second primary winding grouping | groupings of winding 310 (N1) and winding 312 (N2) |
| Secondary winding | windings 316 (N3) |
| Third winding | windings 318 (N4) |
| Fourth winding | windings 320 (N5) |
| Fifth winding | windings 322 (N6) |

AUTOTRANSFORMER RECTIFIER UNIT WITH MULTIPLE ALTERNATING CURRENT LEVEL OUTPUTS

The present disclosure relates generally to power systems, and more particularly to transformer topologies that reduce output common mode voltages.

In many applications, especially shipboard and aircraft applications, multiple direct current (DC) voltage levels are used for motor controllers in different zones of the ship or aircraft. For example, a high voltage direct current (DC) power such as +/−270 Vdc (voltage DC) is used to power motor controllers and a lower voltage DC power such as +/−135 Vdc for low power motor controllers. For example, +/−135 Vdc in some aircraft applications are used for electric brakes.

The weight of feeders for delivering power to equipment such as equipment on shipboard and aircraft applications can be a substantial part of the weight of the power system. One of the ways that can decrease the weight is to provide a higher rectified DC voltage. However, the drawback to having a higher rectified DC voltage is there is often increased common mode voltages on the DC bus.

SUMMARY

An electric power system is provided that includes a three-phase to two twelve-phase output transformer and a first set of a plurality of diode pairs. The three-phase to two twelve-phase output transformer includes a plurality of first primary winding groupings, a plurality of second primary winding groupings, a plurality of secondary windings, a plurality of third windings, a plurality of fourth windings, and a plurality of fifth windings. Each first primary winding grouping includes a plurality of first sub-primary windings coupled in series, wherein each of the first end of a first primary winding grouping is connected to each of the first end of a plurality of the first primary winding groupings to form a wye configuration and a second end of each of the first primary winding groupings defines an input phase connection that receives a phase of a three-phase input voltage. Each second primary winding grouping includes a plurality of second sub-primary windings coupled in series, each second primary winding grouping having a first end and a second end, the first end connected to the first end of the plurality of the first primary winding groupings forming the wye configuration and the second end connected to an output connection of a first twelve phase outputs of the three-phase to two twelve-phase output transformer. Each secondary winding has a first end and a second end with the first end coupled to one of the first twelve phase outputs of the three-phase to two twelve-phase output transformer and the second end connected to a third winding of a plurality of third windings connected between and in series with one of the plurality of first sub-primary windings or connected in series with one of the plurality of second sub-primary windings coupled in series. Each third winding of the plurality of third windings has a first end and a second end, the first end of a third winding is coupled to a second end of one of the plurality of secondary windings and the second end is connected to a fourth winding of a plurality of fourth windings. Each fourth winding of the plurality of fourth windings has a first end and a second end, each fourth winding connected between one of the plurality of first sub-primary windings coupled in series or connected between one of the plurality of second sub-primary windings coupled in series, wherein the first end of the fourth winding is connected to a second end of one of the plurality of third windings and an output connection of a second twelve phase outputs of the three-phase to two twelve-phase output transformer and the second end is connected to a second end of a fifth winding of a plurality of fifth windings and to one of the first sub-primary windings or one of the second sub-primary windings. Each fifth winding of the plurality of fifth windings has a first end connected to an output connection of the second twelve phase outputs of the three-phase to two twelve-phase output transformer and the second end connected to one of the second ends of one of the fourth windings. Each of the first primary winding groupings, the second primary winding groupings, the secondary windings and the third windings are configured such that an output voltage at each one of the first twelve phase outputs of the three-phase to two twelve-phase output transformer is at a sufficiently equivalent voltage of the phase of the three-phase input voltage applied to the input phase connection and the each of the first primary winding groupings, the second primary winding groupings, the secondary windings, the third windings, the fourth windings, and the fifth windings connected to the output connections of the second twelve phase outputs of the three-phase to two twelve-phase output transformer are configured such that an output voltage at each of the output connection of the second twelve phase outputs of the three-phase to two twelve-phase output transformer is at a lower voltage than the phase of the three-phase input voltage applied to the input phase connection. Each diode pair has a first diode end, a second diode end, and an inner connection, each first diode end connected to each first diode end of other diode pairs in the first set of the plurality of diode pairs, each second diode end connected to each second diode end of the other diode pairs in the first set of the plurality of diode pairs, each inner connection connected to one of the first twelve phase outputs of the three-phase to two twelve-phase output transformer.

In accordance with another embodiment of inventive concepts, a method is provided to provide multiple three-phase alternating current (ac) voltages at different output voltage magnitudes based on a three-phase input voltage. The method includes receiving a three-phase input voltage at a three-phase to two twelve-phase output transformer. The three-phase to two twelve-phase output transformer includes a plurality of first primary winding groupings, a plurality of second primary winding groupings, a plurality of secondary windings, a plurality of third windings, a plurality of fourth windings, and a plurality of fifth windings. Each first primary winding grouping includes a plurality of first sub-primary windings coupled in series, wherein each first end of a first primary winding grouping is connected to each of the first end of a plurality of the first primary winding groupings to form a wye configuration and a second end of each of the first primary winding groupings defines an input phase connection that receives a phase of a three-phase input voltage. Each second primary winding grouping includes a plurality of second sub-primary windings coupled in series, each second primary winding grouping having a first end and a second end, the first end connected to the first end of the plurality of the first primary winding groupings forming the wye configuration and the second end connected to an output connection of a first twelve phase outputs of the three-phase to two twelve-phase output transformer. Each secondary winding has a first end and a second end with the first end coupled to one of the first twelve phase outputs of the three-phase to two twelve-phase output transformer and the second end connected to a third winding of a plurality of third windings connected between and in series with one of the plurality of first sub-primary windings or connected in series with one of the plurality of second sub-primary windings coupled in series. Each third winding of the plurality of third windings has a first end and a second end, the first end of a third winding is coupled to a second end of one of the plurality of secondary windings and the second end is connected to a fourth winding of a plurality of fourth windings. Each fourth winding of the plurality of fourth windings has a first end and a second end, each fourth winding connected between one of the plurality of first sub-primary windings coupled in series or connected between one of the plurality of second sub-primary windings coupled in series, wherein the first end of the fourth winding is connected to a second end of one of the plurality of third windings and an output connection of a second twelve phase outputs of the three-phase to two twelve-phase output transformer and the second end is connected to a second end of a fifth winding of a plurality of fifth windings and to one of the first sub-primary windings or one of the second sub-primary windings. Each fifth winding of the plurality of fifth windings has a first end connected to an output connection of the second twelve phase outputs of the three-phase to two twelve-phase output transformer and the second end connected to one of the second ends of one of the fourth windings. Each of the first primary winding groupings, the second primary winding groupings, the secondary windings and the third windings are configured such that an output voltage at each one of the first twelve phase outputs of the three-phase to two twelve-phase output transformer is at a sufficiently equivalent voltage of the phase of the three-phase input voltage applied to the input phase connection and the each of the first primary winding groupings, the second primary winding groupings, the secondary windings, the third windings, the fourth windings, and the fifth windings connected to the output connections of the second twelve phase outputs of the three-phase to two twelve-phase output transformer are configured such that an output voltage at each of the output connection of the second twelve phase outputs of the three-phase to two twelve-phase output transformer is at a lower voltage than the phase of the three-phase input voltage applied to the input phase connection. The method further includes enabling each of the second twelve phase outputs of the three-phase to two twelve-phase output transformer to be connected to an input phase of one of four three-phase ac connections for providing power to equipment operatively connected to one of the four three-phase ac connections during operation. The method further includes enabling each output connection of the first twelve phase outputs of the three-phase to two twelve-phase output transformer to be connected to an input connection of a set of rectifier pairs to provide power to the set of rectifier pairs during operation.

One advantage that may be provided by the inventive concepts is that 230 Vrms is converted efficiently to 115 Vrms ac, +/−135 Vdc and +/−270 Vdc. Another advantage that may be provided is that the reduction in the common mode voltage may eliminate or at least reduce the size of a common mode inductor that is typically used to smooth out the rectified DC voltage on the positive dc bus, thereby leading to a reduction in weight.

In accordance with another embodiment of inventive concepts, a three-phase to two twelve-phase output transformer is provided. The three-phase to two-twelve phase transformer includes a plurality of first primary winding groupings, each first primary winding grouping including a plurality of first sub-primary windings coupled in series, wherein each first end of a first primary winding grouping is connected to each of the first end of a plurality of the first primary winding groupings to form a wye configuration and a second end of each of the first primary winding groupings defines an input phase connection that receives a phase of a three-phase input voltage. The three-phase to two-twelve phase output transformer further includes a plurality of second primary winding groupings, each second primary winding grouping including a plurality of second sub-primary windings coupled in series, each second primary winding grouping having a first end and a second end, the first end connected to the first end of the plurality of the first primary winding groupings forming the wye configuration and the second end connected to an output connection of a first twelve phase outputs of the three-phase to two twelve-phase output transformer. The three-phase to two-twelve phase output transformer further includes a plurality of secondary windings, each secondary winding having a first end and a second end with the first end coupled to an output connection of the first twelve phase outputs of the three-phase to two twelve-phase output transformer and the second end connected to a third winding of a plurality of third windings connected between and in series with one of the plurality of first sub-primary windings or connected in series with one of the plurality of second sub-primary windings coupled in series. The three-phase to two-twelve phase output transformer further includes a plurality of third windings, each third winding of the plurality of third windings having a first end and a second end, wherein the first end of a third winding is coupled to a second end of one of the plurality of secondary windings and the second end is connected to a fourth winding of a plurality of fourth windings. The three-phase to two-twelve phase transformer further includes a plurality of fourth windings, each fourth winding of the plurality of fourth windings having a first end and a second end, each fourth winding connected between one of the plurality of first sub-primary windings coupled in series or connected between one of the plurality of second sub-primary windings coupled in series, wherein the first end of the fourth winding is connected to a second end of one of the plurality of third windings and an output connection of a second twelve phase outputs of the three-phase to two twelve-phase output transformer and the second end is connected to a second end of a fifth winding of a plurality of fifth windings and to one of the first sub-primary windings or one of the second sub-primary windings. The three-phase to two-twelve phase transformer further includes a plurality of fifth windings, each fifth winding of the plurality of fifth windings having a first end connected to an output connection of the second twelve phase outputs of the three-phase to two twelve-phase output transformer and the second end connected to a second end of one of the fourth windings, wherein each of the first primary winding groupings, the second primary winding groupings, the secondary windings and the third windings are configured such that an output voltage at each of the output connection of the first twelve phase outputs of the three-phase to two twelve-phase output transformers is at a sufficiently equivalent voltage of the phase of the three-phase input voltage applied to the input phase connection and the each of the first primary winding groupings, the second primary winding groupings, the secondary windings, the third windings, the fourth windings, and the fifth windings connected to the output connections of the second twelve phase outputs of the three-phase to two twelve-phase output transformer are configured such that an output voltage at each of the output connection of the second twelve phase outputs of the three-phase to two twelve-phase output transformer is at a lower voltage than the phase of the three-phase input voltage applied to the input phase connection.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
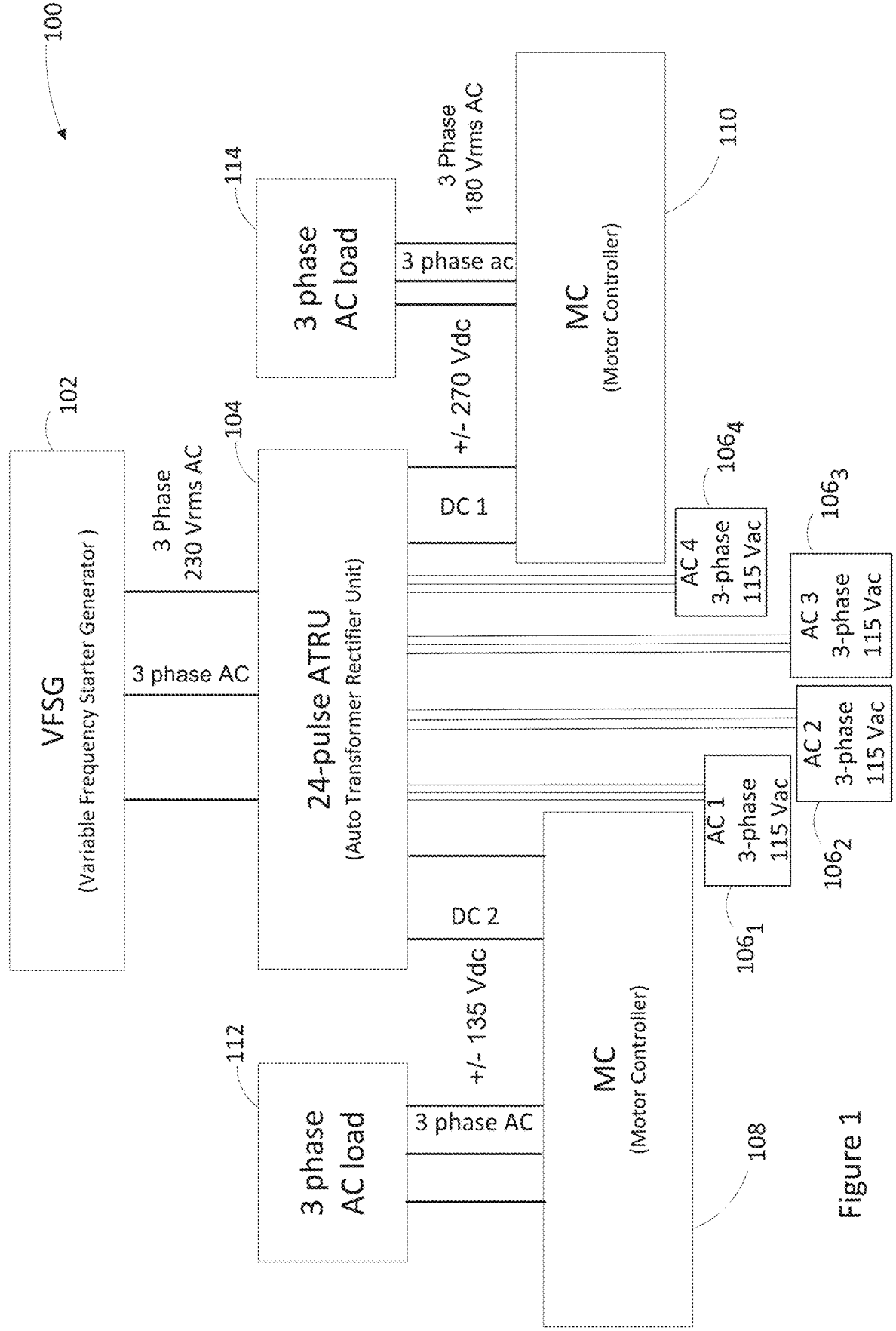
FIG. 1 is an illustration of a power system architecture providing 115 Vrms ac, +/−135 Vdc, and +/−270 Vdc to ac loads and motor controllers according to some embodiments.

Turning to FIG. 1, an exemplary ship or airplane configuration 100 having a variable frequency starter generator (VFSG) 102 is used as power sources and generates three-phase 230 Vrms (voltage root mean square) ac (alternating current). Multiple DC voltage levels are demanded in the modern airplane for motor controllers in different zones. Higher voltage in the pressurized zone will reduce the feeder sizes for both DC bus and motor controller output feeder. Lower voltage in the unpressurized zone will reduce the corona risk of electronic devices at cruise altitude. The VFSG three-phase ac voltage output is provided as a three-phase input to a twenty-four pulse auto transformer rectifier unit (ATRU) 104 that converts the three-phase input to four three-phase 400 Hz, 115 Vrms ac output $106_1$ to $106_4$, +/135 Vdc (voltage direct current) for motor controller 108, and +/−270 Vdc for motor controller 110. Motor controller 108 uses the +/−135 Vdc to generate 115 Vac to control the three-phase ac load 112. Motor controller 110 used the +/−270 Vdc to generate 230 Vrms to control the three-3 phase ac load 114. Traditionally, some airplane configurations had independent air cooled equipment such as multiple galley auto transform units (GATUs), multiple electric brake and position control units (E-BPSUs), and multiple auto transform units (ATUs) to provide power to ac loads. The configuration of FIG. 1 eliminates the independent air cooled equipment by using the twenty-four pulse auto transformer rectifier unit (ATRU) 104. This significantly reduces equipment volume and saves weight.

Figure 2:
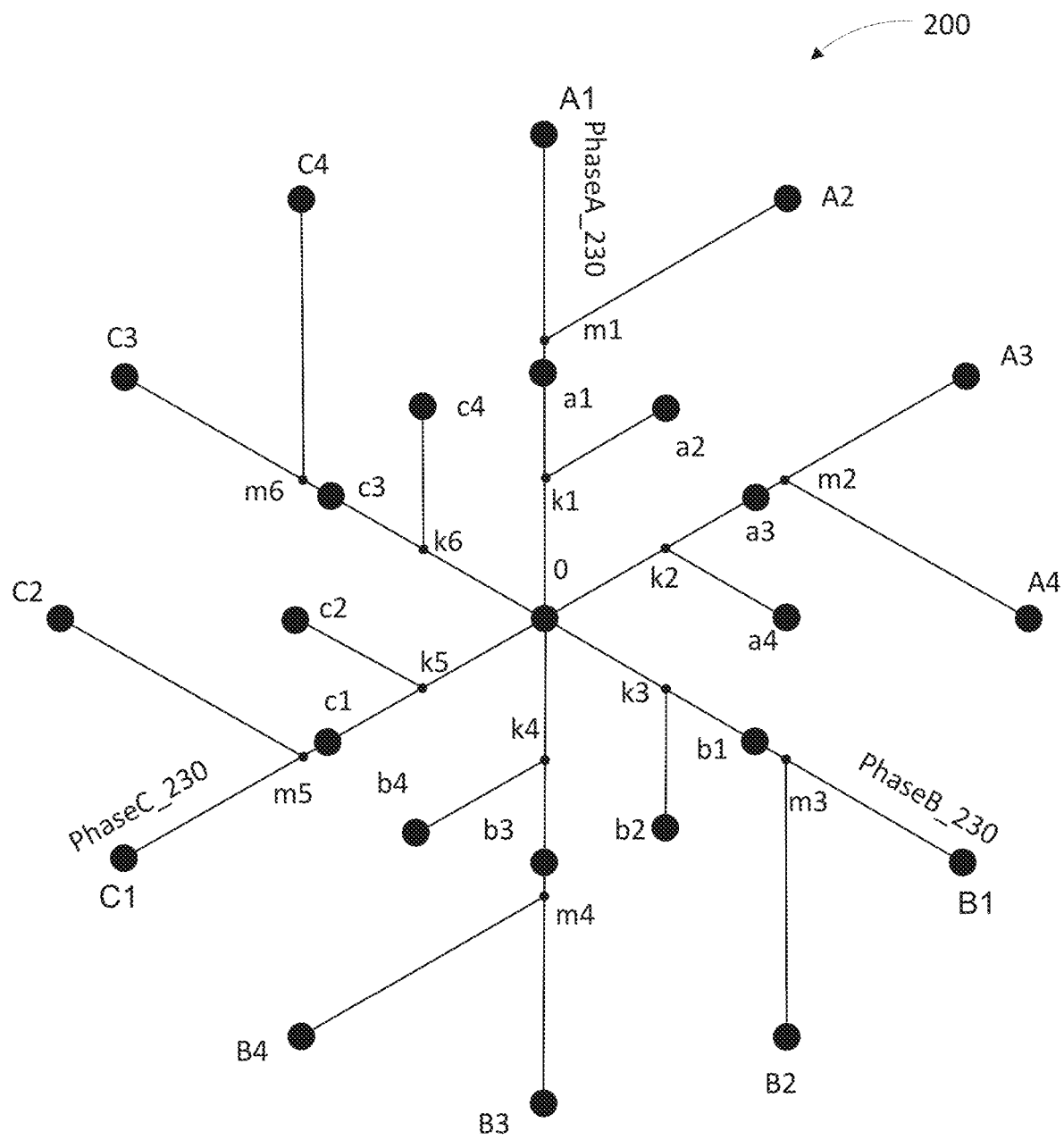
FIG. 2 is an illustration of using a phasor diagram of a three-phase to two-twelve-phases topology to determine the number of windings and winding turns according to some embodiments of inventive concepts.
Figure 3:
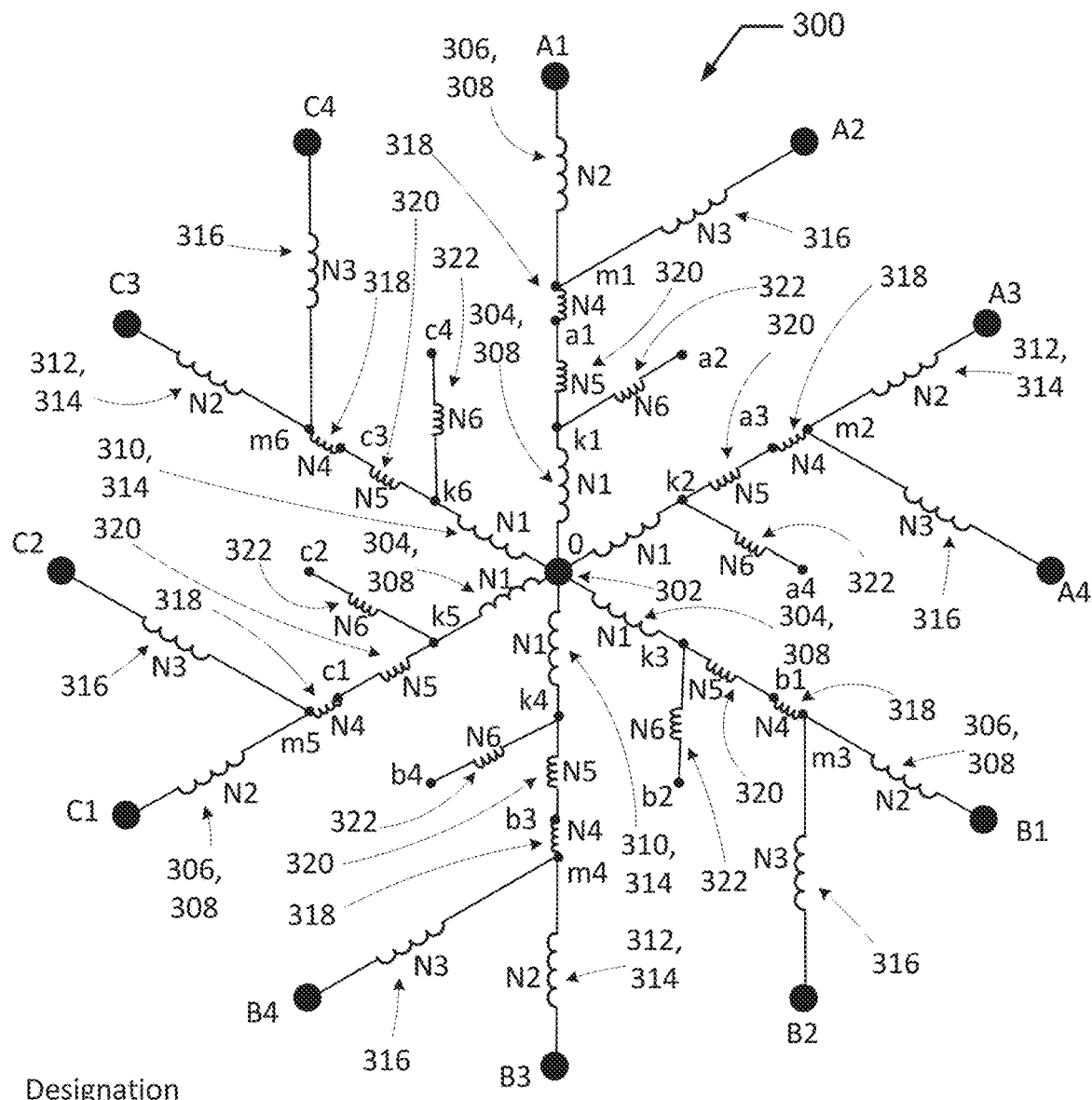
FIG. 3 is an illustration of a three-phase to two twelve-phase transformer according to some embodiments of inventive concepts.

Turning to FIG. 2, a three-phase to two twelve-phase output transformer topology phasor 200 is illustrated for the three-phase to two twelve-phase output transformer 300 (see FIG. 3). The three-phase to two twelve-phase output transformer 300 is a wye topology transformer that converts three-phase ac input voltage into multiple ac outputs at different voltage magnitudes. The neutral is formed at the center of wye windings. The four three-phase ac outputs provide 115 Vrms ac to traditional ATU loads, such as galley appliances in an airplane configuration or a ship configuration. The +/−270 Vdc provides bipolar dc to the high power motor controllers, such as cabin air compressor. The +/−135 Vdc provides bipolar dc to the low power motor controllers, such as electrical brakes.

For a twelve-phase output, the output phases are thirty degrees apart. The length of each line in FIG. 2 is proportional to the number of turns of a winding and proportional to the output voltage. For example, a winding that is located between points A1 and m1 should have the same number of turns as a winding that is located between points B and m4 whereas a winding that is located between point $k_1$ and output $a_2$ has the same number of turns as a winding between point k2 and output a4. Additionally, the total number of winding turns of windings located between points A and 0 has the same total number of winding turns of windings between points A3 and 0, B1 and 0, etc. In FIG. 2, the input phase connections are at $A_1$, $B_1$ and $C_1$. Each winding of the transformer 300 should be in parallel with lines A1-0, B1-0, or C1-0. This can increase magnetic coupling of the windings. The first of the two twelve phase outputs are labeled with capital letters and are A1, A2, A3, A4, B1, B2, B3, B4, C1, C2, C3, and C4. The first of the two twelve phase outputs have voltages that are at the same magnitude of the three phase input received at A1, B1, and C1. The second of the two twelve phase outputs are labeled with lower case letters are and a1, a2, a3, a4, b1, b2, b3, b4, c1, c2, c3, and c4 and are at a voltage of 115 Vrms ac.

Each winding in FIGS. 2 and 3 should be designed to have a minimum number of turns. With the windings having a minimum number of turns, the overall weight of the three-phase to two twelve-phase output transformer 300 will be minimized.

Turning to FIG. 3, a three-phase to two twelve-phase output transformer 300 based on the phasor diagram 200 of FIG. 2 is illustrated. The input phase connections are labeled A1, B1, and C1 and each receive a phase of a three-phase 230 Vrms ac voltage generated by VFSG 102. Winding 304 and winding 306 that are connected in series between the input phase connections A1, B1, and C1 and neutral 302 and that are represented by winding N1 and winding N2, respectively, collectively form a first primary winding grouping 308 with winding 304 and winding 306 being first primary sub-windings. Windings 310, 312 that are connected in series between the neutral 302 and the output phase connections A3, B3, and C3 and that are represented by winding N1 and winding N2, respectively, collectively form a second primary winding grouping 314 with winding 310 and winding 312 being second sub-primary windings. Each first end of a winding 304 of a first primary winding grouping 308 and each first ending of a winding 310 of a second primary winding grouping 314 are connected to each other to form the neutral 302 of the wye configuration. An end of windings 306 and 312 are each connected to an output of the first twelve-phase outputs of the three-phase to two twelve-phase output transformer 300.

Windings represented by windings N3 are secondary windings 316. A first end of each secondary winding 316 is connected to an output of the first twelve-phase outputs of the three-phase to two twelve-phase output transformer 300. A second end of each secondary winding 316 is connected to a third winding 318 (represented by windings N4) that is coupled between and in series with one of the plurality of first sub-primary windings 304, 306 or coupled in series with one of the plurality of second sub-primary windings 310, 312 coupled in series.

Each third winding 318 of the plurality of third windings 318 has a first end and a second end, wherein the first end of a third winding 318 is coupled to a second end of one of the plurality of secondary windings 316 (which is also coupled to one of the windings 306 or one of the windings 312) and the second end is coupled to one of a plurality of fourth windings 320. Windings represented by windings N5 are fourth windings 320. Each fourth winding 320 of the plurality of fourth windings 320 has a first end and a second end, each fourth winding 320 connected between one of the plurality of first sub-primary windings (windings 304 and windings 306) coupled in series or connected between one of the plurality of second sub-primary windings (windings 310 and windings 312) coupled in series, wherein the first end of the fourth winding 320 is connected to a second end of one of the plurality of third windings and an output connection of a second twelve phase outputs of the three-phase to two twelve-phase output transformer and the second end is connected to a second end of a fifth winding 322 of a plurality of fifth windings 322 and to one of the first sub-primary windings or one of the second sub-primary windings Each of the first primary winding groupings, the second primary winding groupings, the secondary windings and the third windings are configured such that an output voltage at each output connection of the first twelve phase outputs of the three-phase to two twelve-phase output transformers is at a sufficiently equivalent voltage of the phase of the three-phase input voltage applied to the input phase connection and the each of the first primary winding groupings, the second primary winding groupings, the secondary windings, the third windings, the fourth windings, and the fifth windings connected to the output connections of the second twelve phase outputs of the three-phase to two twelve-phase output transformer are configured such that an output voltage at each of the output connection of the second twelve phase outputs of the three-phase to two twelve-phase output transformer is at a lower voltage than the phase of the three-phase input voltage applied to the input phase connection. In other words, the number of turns in winding N1 and winding N5 are equal to the number of turns in winding N4 and winding N2. For example, when 230 Vrms ac is applied to the input phase connections A1, B1, and C1, the output voltage at the output connections A1, A2, A3, A4, B1, B2, B3, B4, C1, C2, C3, C4 are also at 230 Vrms ac and the output voltages at the output connections a1, a2, a3, a4, b1, b2, b3, b4, c1, c2, c3, and c4 are at 115 Vrms ac.

Each of the lines A1-0, B1-0 and C1-0 are in one of three planes that run through one of the lines A1-0, B1-0, and C1-0 where 0 is the wye neutral. Each of the first primary winding groupings are located in one of the three planes, each one of the three planes intersecting a midpoint (i.e., the wye neutral) of the wye configuration that each of the first end of a first primary winding grouping is connected thereto, each secondary winding grouping, each secondary winding, each third winding, each fourth winding, and each fifth winding arranged to be in or parallel to one of the three planes. This can be seen in FIGS. 2 and 3 where all of the lines of the three-phase to two twelve-phase output transformer topology phasor 200 are parallel with one of the lines A1-0, B1-0, and C1-0.

Figure 4:
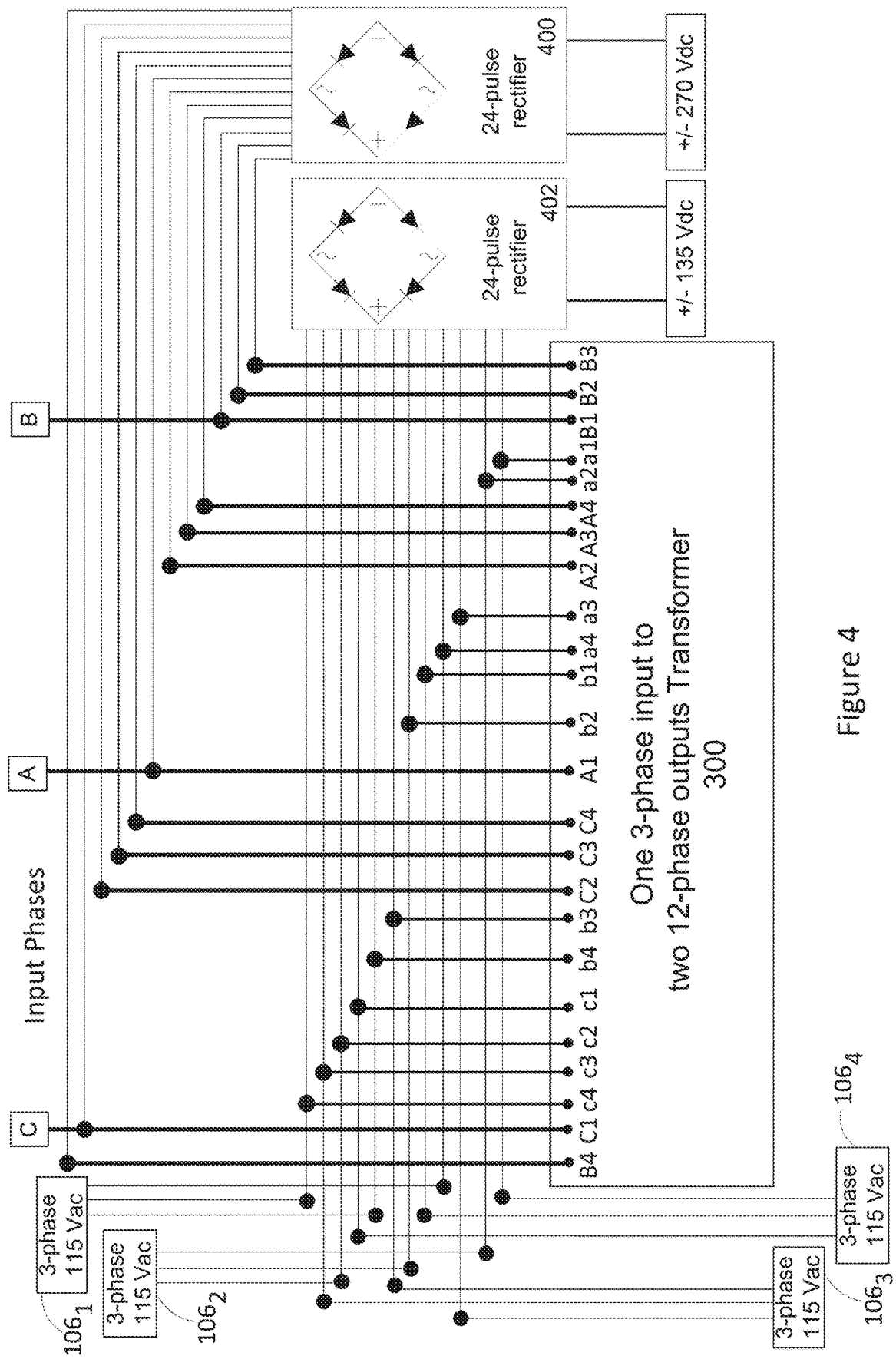
FIG. 4 is a block diagram of the three-phase to two twelve-phase transformer producing two twelve-phase outputs and four three-phase outputs according to some embodiments of inventive concepts.
Figure 5:
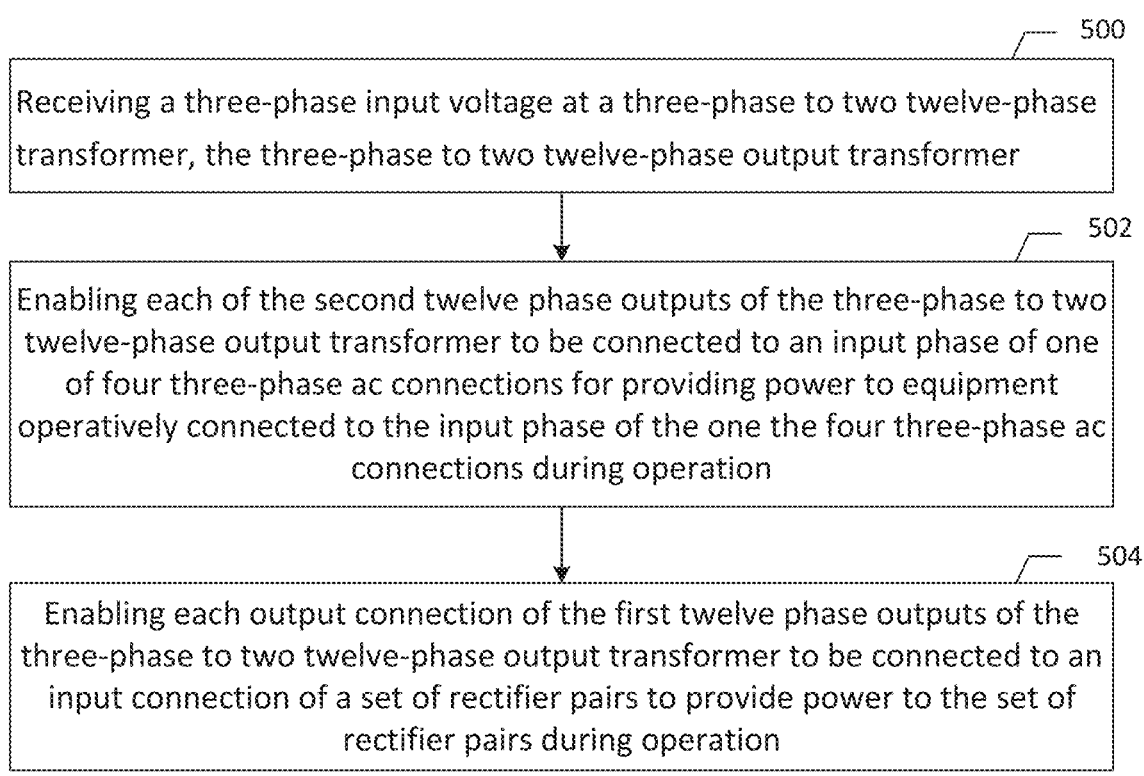
FIG. 5 is a flow chart illustrating operations to provide two twelve-phase three phase as outputs with reduced common mode voltage on a DC bus of a 24 pulse rectifier according to some embodiments of inventive concepts.

Turning now to FIGS. 4 and 5, an embodiment of how the connections of the three-phase to two twelve-phase output transformer 300 are connected is illustrated. The three phases of the 230 Vrms ac VFSG output voltages (or other 230 Vrms ac from another source), which generate a variable frequency constant voltage, are connected to input connections A1, B1, and C1 of the three-phase to two twelve-phase output transformer 300. Thus, at block 500 of FIG. 5, a three-phase input voltage from the variable frequency constant voltage generator is received at a three-phase to two twelve-phase output transformer 300 where each input phase connection receives a phase of the variable frequency constant voltage generator. When the 230 Vrms ac is applied, the first of the two twelve phase outputs produce substantially the same voltage (e.g., 230 Vrms) as the three-phase input voltage at output connections A1, B1, C1, A2, B2, C2, A3, B3, C3, A4, B4, and C4. The output connections A1, B1, C1, A2, B2, C2, A3, B3, C3, A4, B4, and C4 are connected to a 24 pulse rectifier 400 that rectifies the 230 Vrms ac to +/−270 Vdc. The second of the two twelve-phase outputs produce 115 Vrms ac at output connections a1, b1, c1, a2, b2, c2, a3, b3, c3, a4, b4, and c4. Each phase of the second of the two twelve-phase outputs produces substantially similar power (e.g., substantially approximate to 115 Vrms ac) during operation. The output connections a1, b1, c1, a2, b2, c2, a3, b3, c3, a4, b4, and c4 are connected to a 24 pulse rectifier 402 that rectifies the 115 Vrms ac to +/−135 Vdc. The output connections a1, b1, c1, a2, b2, c2, a3, b3, c3, a4, b4, and c4 are also used to provide three-phase 115 Vrms ac to the four three-phase 115 Vrms ac outputs $106_1$ to $106_4$. Thus, at block 502 of FIG. 5, each phase of the second twelve phase outputs of the three-phase to two twelve-phase output transformer is enabled to be connected to an input phase of one of four three-phase ac connections for providing power to equipment operatively connected to the input phase of the one the four three-phase ac connections during operation. At block 504 of FIG. 5, each output connection of the first twelve phase outputs of the three-phase to two twelve-phase output transformer is enabled to be connected to an input connection of a set of rectifier pairs to provide power to the set of rectifier pairs during operation. Thus, the use of the three-phase to two twelve-phase output transformer provides multiple three-phase ac voltages at different voltage magnitudes (e.g., when 230 Vrms is applied to the input phase connections, the first twelve phase outputs are at approximately 230 Vrms and the second twelve-phase outputs are at approximately 115 Vrms).

Figure 6:
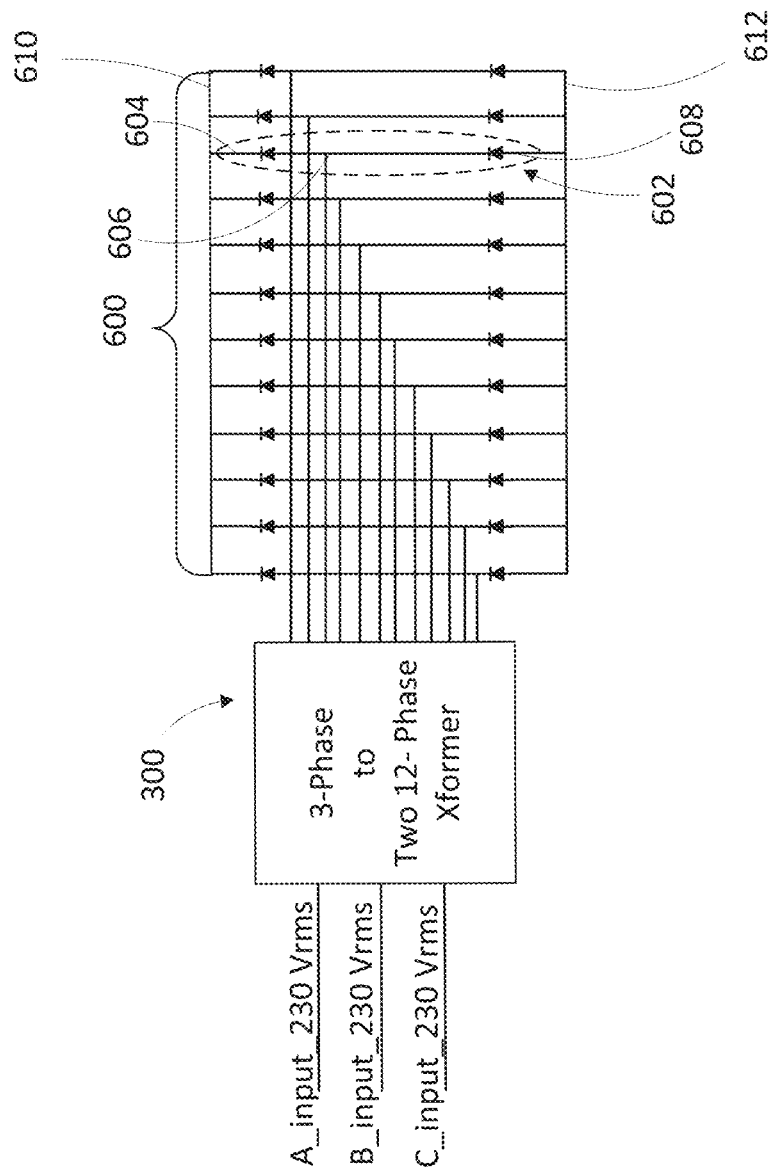
FIG. 6 is a block diagram illustrating the three-phase to two twelve-phase transformer connected to a 24 pulse rectifier according to some embodiments of inventive concepts.

Turning to FIG. 6, the 24 pulse rectifier 400 in one embodiment each includes twelve sets 600 of diode pairs 602 connected in parallel, with each pair 602 of diodes having a first diode end 604, a second diode end 608, and an inner connection 606. The twelve sets of the diode pairs in one embodiment are a plurality of separate diodes connected in series with each other to form the twelve sets of diode pairs. Each first diode end of the twelve sets of diode pairs are coupled to each other and form a positive DC voltage bus 610. Each second diode end of the twelve sets of diode pairs are connected to each other and form a negative DC voltage bus 612. The 24 pulse rectifier 402 has twelve sets of second diode pairs connected similarly to the way 24 pulse rectifier 400 is connected. Thus, for each output connection of the second twelve phase outputs of the three-phase to two twelve-phase output transformer, the output connection is connected to an inner connection of one of the twelve sets of second diode pairs in a second set of rectifier pairs where each first diode end of the twelve sets of second diode pairs connected to each other to form a positive DC voltage bus and each second diode end of the twelve sets of second diode pairs are connected to each other to form a negative DC voltage bus. During operation, the twelve sets of diode pairs in 24 pulse rectifier 400 receives the first of the two twelve phase output voltages at the output connections A1, A2, A3, A4, B1, B2, B3, B4, C1, C2, C3, and C4 of the three-phase to two twelve-phase output transformer 300 with one of the output connections connected to each inner connection of the twelve sets of diode pairs and the output voltages are rectified to form +/−270 Vdc with a reduced common mode voltage where the positive DC voltage bus is substantially approximately 270 Vdc higher than the negative DC voltage bus. Similarly, the twelve sets of second diode pairs in 24 pulse rectifier 402 receives the second of the two twelve phase output voltages at the output connections a1, a2, a3, a4, b1, b2, b3, b4, c1, c2, c3, and c4 of the three-phase to two twelve-phase output transformer 300 with one of the output connections connected to each inner connection of the twelve sets of diode pairs and the output voltages are rectified to form a +/−135 Vdc with a reduced common mode voltage.

Figure 7:
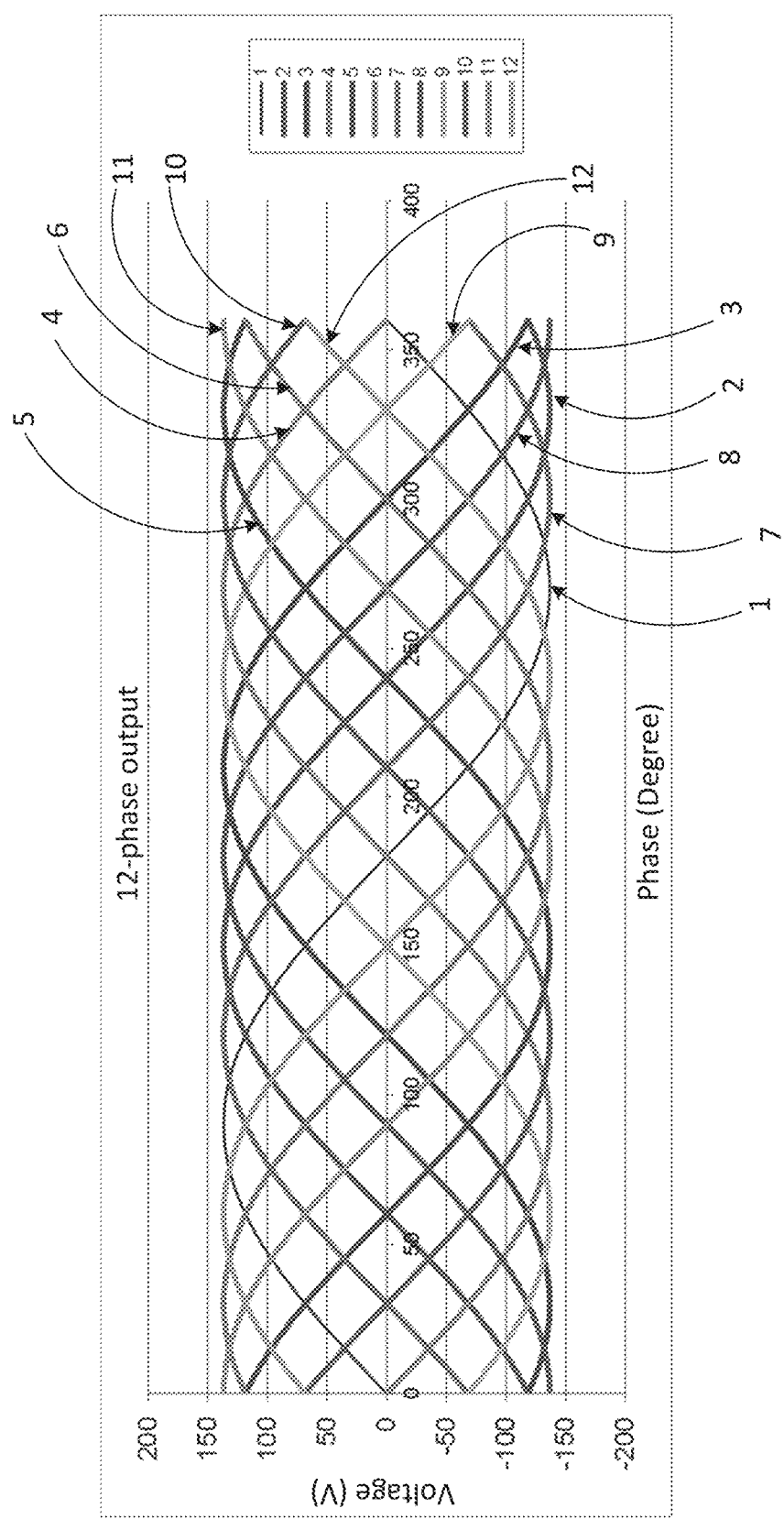
FIG. 7 is an illustration of one of the two twelve-phase outputs of the three-phase to two twelve-phase transformer according to some embodiments of inventive concepts.
Figure 8:
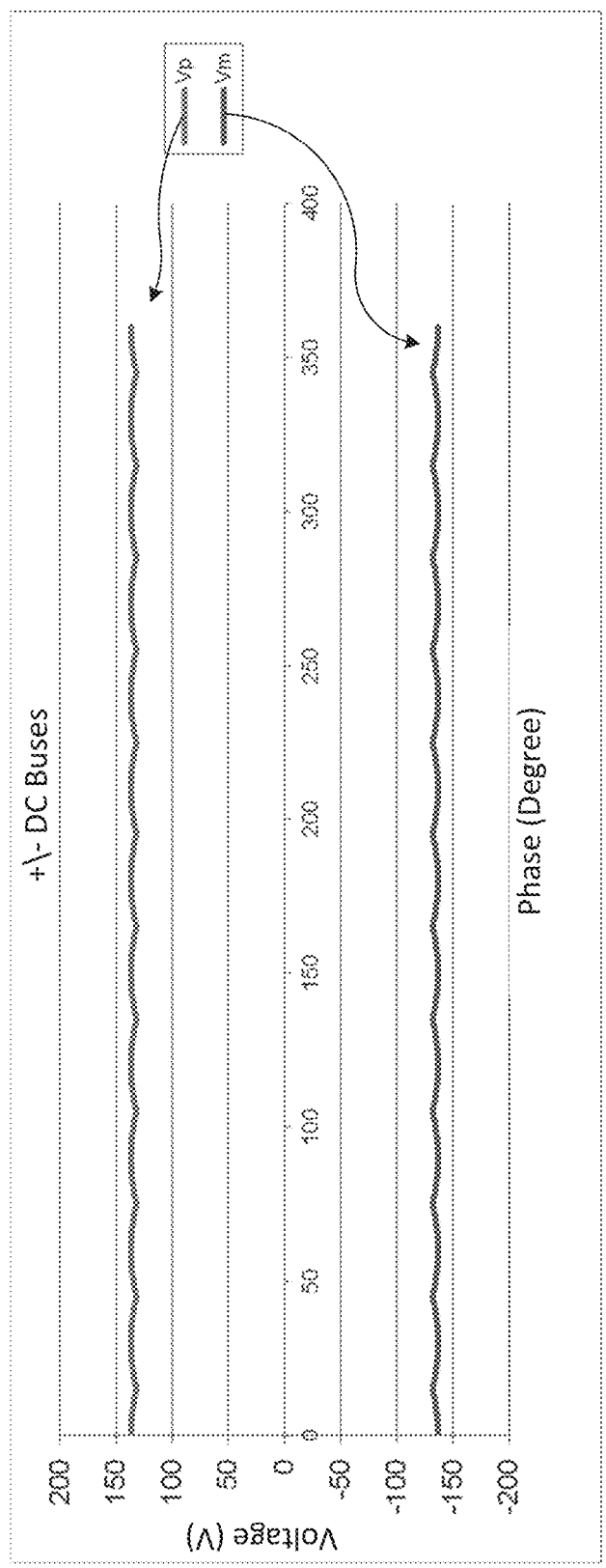
FIG. 8 is an illustration of the rectifier output on the +/−135 Vdc bus according to some embodiments of inventive concepts.
Figure 9:
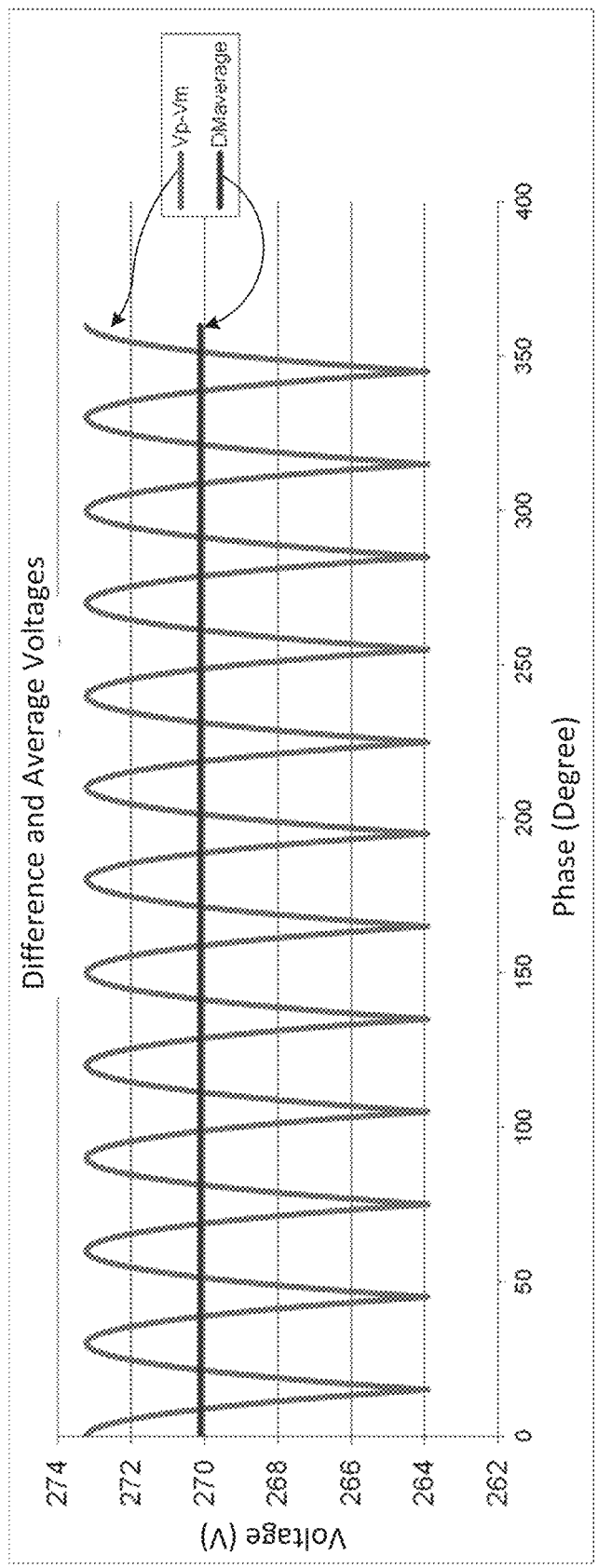
FIG. 9 is an illustration of the +/−135 Vdc bus differential voltage and average voltage according to some embodiments of inventive concepts.
Figure 10:
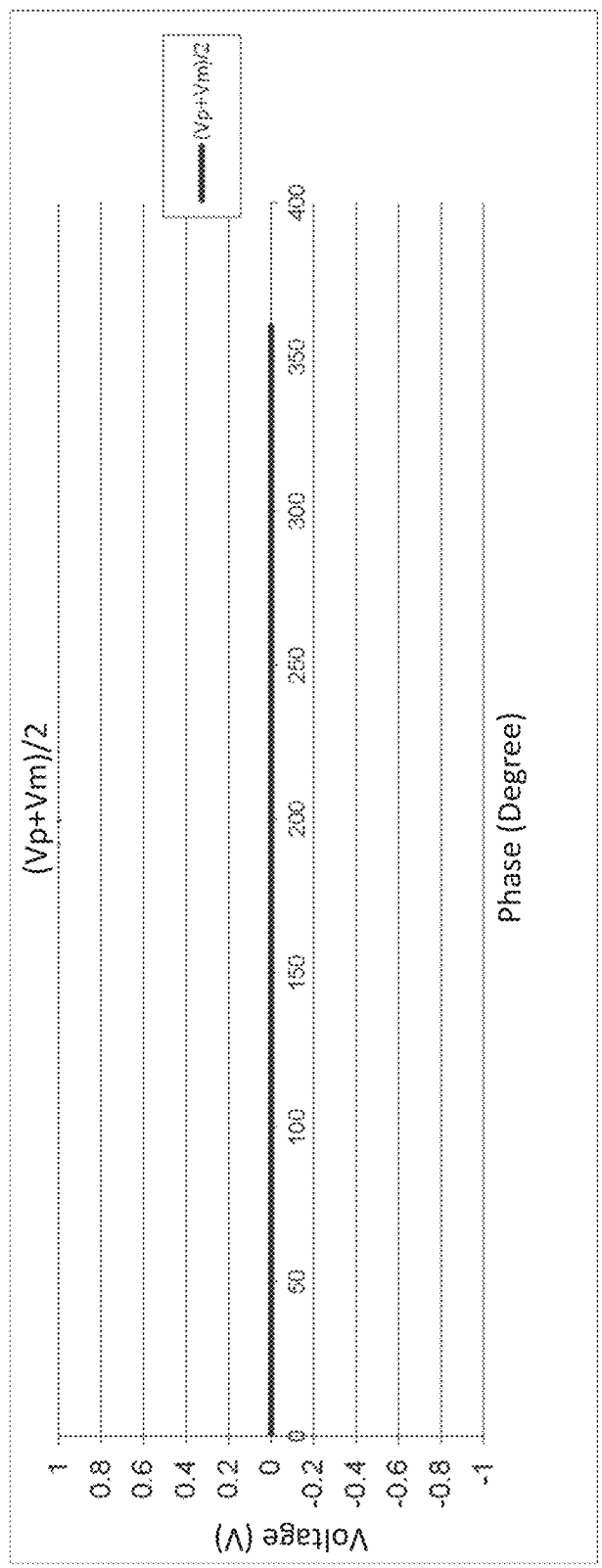
FIG. 10 is an illustration of the +/−135 Vdc bus common mode voltage according to some embodiments of inventive concepts.

Turning to FIG. 7, an example of the voltages output at the second of the two twelve-phase outputs is illustrated where each of the 115 Vrms output voltages at connections a1, a2, a3, a4, b1, b2, b3, b4, c1, c2, c3 and c4 are shown. FIG. 8 illustrates the rectifier output of the 24 pulse rectifier 402 of the +/−135 Vdc busses. FIG. 9 illustrates the dc buss differential voltage and average voltage. FIG. 10 illustrates the +/−135 Vdc bus common mode voltages, which is sufficiently close to zero such that a common mode inductor that is part of some 24 pulse rectifiers can be eliminated or substantially reduced in size.

The three-phase to two twelve-phase output transformer in one embodiment is installed in an aircraft platform. When installed, each phase of the second twelve phase outputs of the three-phase to two twelve-phase output transformer is connected to an input phase of one of four three-phase ac connections for providing power to equipment (e.g., a three-phase output load) operatively connected to the input phase of the one the four three-phase ac connections. In other words, each phase of the second twelve phase outputs of the three-phase to two twelve-phase output transformer is connected to a phase of one of four three-phase output loads. The voltages generated at the outputs of the first of the two-twelve phase outputs of the three-phase to two twelve-phase output transformer and the generated +/−270 Vdc should be installed in a pressurized zone of the aircraft platform. Thus, the three-phase to two twelve-phase output transformer and the 24 pulse rectifier 400 are mounted in a pressurized zone of the aircraft platform. The 24 pulse rectifier 402 may also be mounted in the pressurized zone. Thus, the twelve sets of diode pairs are mounted in a pressurized zone of the aircraft platform.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof.

Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

What is claimed is:

1. A power system comprising:
a three-phase to two twelve-phase output transformer comprising:
a plurality of first primary winding groupings, each first primary winding grouping including a plurality of first sub-primary windings coupled in series, wherein each first end of a first primary winding grouping is connected to each of the first end of a plurality of the first primary winding groupings to form a wye configuration and a second end of each of the first primary winding groupings defines an input phase connection that receives a phase of a three-phase input voltage;
a plurality of second primary winding groupings, each second primary winding grouping including a plurality of second sub-primary windings coupled in series with each other, each second primary winding grouping having a first end and a second end, the first end connected to the first end of the plurality of the first primary winding groupings forming the wye configuration and the second end connected to an output connection of a first twelve phase outputs of the three-phase to two twelve-phase output transformer;
a plurality of secondary windings, each secondary winding having a first end and a second end with the first end coupled to one of the first twelve phase outputs of the three-phase to two twelve-phase output transformer and the second end connected to a third winding of a plurality of third windings connected between and in series with one of the plurality of first sub-primary windings or connected in series with one of the plurality of second sub-primary windings coupled in series;
each third winding of the plurality of third windings having a first end and a second end, wherein the first end of a third winding is coupled to a second end of one of the plurality of secondary windings and the second end is connected to a fourth winding of a plurality of fourth windings,
each fourth winding of the plurality of fourth windings having a first end and a second end, each fourth winding connected between one of the plurality of first sub-primary windings coupled in series or connected between one of the plurality of second sub-primary windings coupled in series, wherein the first end of the fourth winding is connected to a second end of one of the plurality of third windings and an output connection of a second twelve phase outputs of the three-phase to two twelve-phase output transformer and the second end is connected to a second end of a fifth winding of a plurality of fifth windings and to one of the first sub-primary windings or one of the second sub-primary windings;
each fifth winding of the plurality of fifth windings having a first end connected to an output connection of the second twelve phase outputs of the three-phase to two twelve-phase output transformer and the second end connected to one of the second ends of one of the fourth windings;
wherein each of the first primary winding groupings, the second primary winding groupings, the secondary windings and the third windings are configured such that an output voltage at each one of the first twelve phase outputs of the three-phase to two twelve-phase output transformers is at a sufficiently equivalent voltage of the phase of the three-phase input voltage applied to the input phase connection and the each of the first primary winding groupings, the second primary winding groupings, the secondary windings, the third windings, the fourth windings, and the fifth windings connected to the output connections of the second twelve phase outputs of the three-phase to two twelve-phase output transformer are configured such that an output voltage at each of the output connections of the second twelve phase outputs of the three-phase to two twelve-phase output transformer is at a lower voltage than the three-phase input voltage applied to the input phase connections; and
a first set of a plurality of diode pairs; each diode pair having a first diode end, a second diode end, and an inner connection, each first diode end connected to each first diode end of other diode pairs in the first set of the plurality of diode pairs, each second diode end connected to each second diode end of the other diode pairs in the first set of the plurality of diode pairs, each inner connection connected to one of the first twelve phase outputs of the three-phase to two twelve-phase output transformer.

2. The power system of claim 1, wherein each winding of the first primary winding groupings, each winding of the second primary winding groupings, each secondary winding, each third winding, each fourth winding, and each fifth winding has a number of turns in the winding such that when a phase of a three-phase input voltage of 230 Vrms ac is applied to each input phase connection, the first twelve phase outputs of the three-phase to two twelve-phase output transformer is at a substantially same voltage as the three-phase input voltage and the second twelve phase outputs of the three-phase to two twelve-phase output transformer is substantially approximate to 115 Vrms ac.

3. The power system of claim 1, wherein each of the first primary winding groupings are located in one of three planes, each one of the three planes intersecting a midpoint of the wye configuration that each of the first end of a first primary winding grouping is connected thereto, each secondary winding grouping, each secondary winding, each third winding, each fourth winding, and each fifth winding arranged to be in or parallel to one of the three planes.

4. The power system of claim 1 wherein the second end of each of the first primary winding groupings further defines an output phase connection of the first twelve phase outputs of the two twelve-phase output transformer.

5. The power system of claim 1 wherein each first diode end of the twelve sets of diode pairs are connected to each other to form a positive DC voltage bus and each second diode end of the twelve sets of diode pairs are connected to each other to form a negative DC voltage bus such that when a phase of a three-phase input voltage of 230 Vrms ac is applied to each input phase connection, the positive DC voltage bus is substantially approximately 270 Vdc higher than the negative DC voltage bus.

6. The power system of claim 1 wherein the twelve sets of diode pairs are mounted in a pressurized zone of an aircraft platform.

7. The power system of claim 1 further comprising:
a second set of a plurality of diode pairs; each diode pair having a first diode end, a second diode end, and an inner connection, each first diode end connected to each first diode end of other diode pairs in the second set of the plurality of diode pairs, each second diode end connected to each second diode end of the other diode pairs in the first set of the plurality of diode pairs, each inner connection connected to one of the second twelve phase outputs of the three-phase to two twelve-phase output transformer.

8. The power system of claim 1 further comprising a variable frequency constant voltage generator wherein the three-phase input voltage comprises a three-phase input voltage from the variable frequency constant voltage generator and wherein each input phase connection receives a phase of the variable frequency constant voltage generator.

9. The power system of claim 1 wherein the first set of the plurality of diode pairs comprises a plurality of separate diodes connected in series with each other.

10. The power system of claim 1 wherein each phase of the second twelve phase outputs of three-phase to two twelve-phase output transformer is connected to a phase of one of four three-phase output loads.

11. The power system of claim 10 where each phase of the second twelve phase outputs of the three-phase to two twelve-phase output transformer produces substantially similar power during operation.

12. A method to provide three-phase ac voltages at different output voltage magnitudes based on a three-phase input voltage, the method comprising:
receiving a three-phase input voltage at a three-phase to two twelve-phase output transformer, the three-phase to two twelve-phase output transformer comprising:
a plurality of first primary winding groupings, each first primary winding grouping including a plurality of first sub-primary windings coupled in series, wherein each first end of a first primary winding grouping is connected to each of the first end of a plurality of the first primary winding groupings to form a wye configuration and each second end of each of the first primary winding groupings defining an input phase connection that receives a phase of the three-phase input voltage;
a plurality of second primary winding groupings, each second primary winding grouping including a plurality of second sub-primary windings coupled in series, each second primary winding grouping having a first end and a second end, the first end connected to the first end of the plurality of the first primary winding groupings forming the wye configuration and the second end connected to an output connection of a first twelve phase outputs of the three-phase to two twelve-phase output transformer;
a plurality of secondary windings, each secondary winding having a first end and a second end with the first end coupled to an output connection of the first twelve phase outputs of the three-phase to two twelve-phase output transformer and the second end connected to a third winding of a plurality of third windings connected between and in series with one of the plurality of first sub-primary windings or connected in series with one of the plurality of second sub-primary windings coupled in series;
each third winding of the plurality of third windings having a first end and a second end, wherein the first end of a third winding is coupled to a second end of one of the plurality of secondary windings and the second end is connected to a fourth winding of a plurality of fourth windings,
each fourth winding of the plurality of fourth windings having a first end and a second end, each fourth winding connected between one of the plurality of first sub-primary windings coupled in series or connected between one of the plurality of second sub-primary windings coupled in series, wherein the first end of the fourth winding is connected to a second end of one of the plurality of third windings and an output connection of a second twelve phase outputs of the three-phase to two twelve-phase output transformer and the second end is connected to a second end of a fifth winding of a plurality of fifth windings and to one of the first sub-primary windings or one of the second sub-primary windings;

each fifth winding of the plurality of fifth windings having a first end connected to an output connection of the second twelve phase outputs of the three-phase to two twelve-phase output transformer and the second end connected to a second end of one of the fourth windings;

wherein each of the first primary winding groupings, the second primary winding groupings, the secondary windings and the third windings are configured such that an output voltage at each output connection of the first twelve phase outputs of the three-phase to two twelve-phase output transformers is at a sufficiently equivalent voltage of the phase of the three-phase input voltage applied to the input phase connection and the each of the first primary winding groupings, the second primary winding groupings, the secondary windings, the third windings, the fourth windings, and the fifth windings connected to the output connections of the second twelve phase outputs of the three-phase to two twelve-phase output transformer are configured such that an output voltage at each of the output connection of the second twelve phase outputs of the three-phase to two twelve-phase output transformer is at a lower voltage than the phase of the three-phase input voltage applied to the input phase connection;

enabling each of the second twelve phase outputs of the three-phase to two twelve-phase output transformer to be connected to an input phase of one of four three-phase ac connections for providing power to equipment operatively connected to one of the four three-phase ac connections during operation; and enabling each output connection of the first twelve phase outputs of the three-phase to two twelve-phase output transformer to be connected to an input connection of a set of rectifier pairs to provide power to the set of rectifier pairs during the operation.

13. The method of claim 12, further comprising:
for each output connection of the first twelve phase outputs of the three-phase to two twelve-phase output transformer, connecting the output connection to an inner connection of one of twelve sets of diode pairs in the set of rectifier pairs;
connecting each first diode end of the twelve sets of diode pairs to each other to form a positive DC voltage bus; and
connecting each second diode end of the twelve sets of diode pairs to each other to form a negative DC voltage bus.

14. The method of claim 12, further comprising:
for each output connection of the second twelve phase outputs of the three-phase to two twelve-phase output transformer, connecting the output connection to an inner connection of one of twelve sets of second diode pairs in a second set of rectifier pairs;
connecting each first diode end of the twelve sets of second diode pairs to each other to form a positive DC voltage bus; and
connecting each second diode end of the twelve sets of second diode pairs to each other to form a negative DC voltage bus.

15. The method of claim 12, wherein each of the first primary winding groupings are located in one of three planes, each one of the three planes intersecting a midpoint of the wye configuration that each of the first end of a first primary winding grouping is connected thereto, the method further comprising placing each secondary winding grouping, each secondary winding, each third winding, each fourth winding, and each fifth winding to be in or parallel to one of the three planes.

16. The method of claim 12 further comprising:
installing the three-phase to two twelve-phase output transformer in an aircraft platform.

17. A three-phase to two twelve-phase output transformer comprising:
a plurality of first primary winding groupings, each first primary winding grouping including a plurality of first sub-primary windings coupled in series, wherein each first end of a first primary winding grouping is connected to each of the first end of a plurality of the first primary winding groupings to form a wye configuration and a second end of each of the first primary winding groupings defines an input phase connection that receives a phase of a three-phase input voltage;

a plurality of second primary winding groupings, each second primary winding grouping including a plurality of second sub-primary windings coupled in series, each second primary winding grouping having a first end and a second end, the first end connected to the first end of the plurality of the first primary winding groupings forming the wye configuration and the second end connected to an output connection of a first twelve phase outputs of the three-phase to two twelve-phase output transformer;

a plurality of secondary windings, each secondary winding having a first end and a second end with the first end coupled to an output connection of the first twelve phase outputs of the three-phase to two twelve-phase output transformer and the second end connected to a third winding of a plurality of third windings connected between and in series with one of the plurality of first sub-primary windings or connected in series with one of the plurality of second sub-primary windings coupled in series;

each third winding of the plurality of third windings having a first end and a second end, wherein the first end of a third winding is coupled to a second end of one of the plurality of secondary windings and the second end is connected to a fourth winding of a plurality of fourth windings, each fourth winding of the plurality of fourth windings having a first end and a second end, each fourth winding connected between one of the plurality of first sub-primary windings coupled in series or connected between one of the plurality of second sub-primary windings coupled in series, wherein the first end of the fourth winding is connected to a second end of one of the plurality of third windings and an output connection of a second twelve phase outputs of the three-phase to two twelve-phase output transformer and the second end is connected to a second end of a fifth winding of a plurality of fifth windings and to one of the first sub-primary windings or one of the second sub-primary windings;

each fifth winding of the plurality of fifth windings having a first end connected to an output connection of the second twelve phase outputs of the three-phase to two twelve-phase output transformer and the second end connected to a second end of one of the fourth windings; and wherein each of the first primary winding groupings, the second primary winding groupings, the secondary windings and the third windings are configured such that an output voltage at each of the output connection of the first twelve phase outputs of the three-phase to two twelve-phase output transformers is at a sufficiently equivalent voltage of the phase of the three-phase input voltage applied to the input phase connection and the each of the first primary winding groupings, the second primary winding groupings, the secondary windings, the third windings, the fourth windings, and the fifth windings connected to the output connections of the second twelve phase outputs of the three-phase to two twelve-phase output transformer are configured such that an output voltage at each of the output connections of the second twelve phase outputs of the three-phase to two twelve-phase output transformer is at a lower voltage than the three-phase input voltage applied to the input phase connections.

18. The three-phase to two twelve-phase output transformer of claim 17, wherein each winding of the first primary winding groupings, each winding of the second primary winding groupings, each secondary winding, each third winding, each fourth winding, and each fifth winding has a number of turns in the winding such that when a phase of a three-phase input voltage of 230 Vrms ac is applied to each input phase connection, the first twelve phase outputs of the three-phase to two twelve-phase output transformer is at a substantially same voltage as the three-phase input voltage and the second twelve phase outputs of the three-phase to two twelve-phase output transformer is substantially approximate to 115 Vrms ac.

19. The three-phase to two twelve-phase output transformer of claim 17, wherein each of the first primary winding groupings are located in one of three planes, each one of the three planes intersecting a midpoint of the wye configuration that each of the first end of a first primary winding grouping is connected thereto, each secondary winding grouping, each secondary winding, each third winding, each fourth winding, and each fifth winding are arranged to be in or parallel to one of the three planes.

20. The three-phase to two twelve-phase output transformer of claim 17 wherein the second end of each of the first primary winding groupings further defines an output phase connection of the first twelve phase outputs of the three-phase to two twelve-phase output transformer.

* * * * *